US 6,685,221 B1

(12) United States Patent
Serban et al.

(10) Patent No.: US 6,685,221 B1
(45) Date of Patent: Feb. 3, 2004

(54) DEVICE FOR STOPPING AN AIRBAG UNFOLDING IN A MOTOR VEHICLE

(75) Inventors: Bogdan Serban, Niederkorn (LU); Michel Witte, Luxembourg (LU); Aloyse Schoos, Bertrange (LU)

(73) Assignee: I.E.E. International Electronics & Engineering S.a.r.l., Luxembourg (LU)

(*) Notice: Subject to any disclaimer, the term of this patent is extended or adjusted under 35 U.S.C. 154(b) by 0 days.

(21) Appl. No.: 09/914,719

(22) PCT Filed: Feb. 28, 2000

(86) PCT No.: PCT/EP00/01654

§ 371 (c)(1),
(2), (4) Date: Dec. 11, 2001

(87) PCT Pub. No.: WO00/51849

PCT Pub. Date: Sep. 8, 2000

(30) Foreign Application Priority Data

Mar. 1, 1999 (LU) .................................................. 90358

(51) Int. Cl.⁷ .......................... B60R 21/16; B60R 21/32
(52) U.S. Cl. ........................ 280/735; 280/742; 280/731
(58) Field of Search ................................ 280/735, 734, 280/736, 740, 742, 731, 732

(56) References Cited

U.S. PATENT DOCUMENTS 5,957,490 A * 9/1999 Sinnhuber .................. 280/735
5,992,880 A * 11/1999 Cuddihy et al. ............ 280/735
6,036,226 A * 3/2000 Brown et al. ............... 280/736
6,164,694 A * 12/2000 Yoshida et al. ............. 280/736
6,189,923 B1 * 2/2001 Tsubone ..................... 280/735
6,189,928 B1 * 2/2001 Sommer et al. ........... 280/743.2
6,308,983 B1 * 10/2001 Sinnhuber ................... 280/735

FOREIGN PATENT DOCUMENTS

| EP | 0967123 A2 | * | 6/1999 | |
| GB | 2 319 997 A | | 6/1998 | |
| JP | 03248946 A | * | 11/1991 | ........... B60R/21/20 |
| WO | WO98/39180 | | 9/1998 | |
| WO | WO98/51547 | | 11/1998 | |

* cited by examiner

*Primary Examiner*—David R. Dunn
(74) *Attorney, Agent, or Firm*—McCormick, Paulding & Huber LLP

(57) ABSTRACT

A system for stopping the deployment of an airbag in a vehicle includes a detector for detecting a position of the airbag with respect to an occupant of the vehicle and an airbag operating device. The detector is located on the airbag in an area which, upon deployment of the airbag, is facing the occupant of the vehicle. The detector generates a position signal which is sent to the airbag operating device such that the airbag operating device stops the deployment of the airbag when the position signal indicates a predetermined position of the airbag in relation to the occupant.

13 Claims, 2 Drawing Sheets

DEVICE FOR STOPPING AN AIRBAG UNFOLDING IN A MOTOR VEHICLE

FIELD OF THE INVENTION

The present invention concerns a device for stopping the deployment of an airbag in a vehicle.

BACKGROUND OF THE INVENTION

In order to protect the life of passengers in a traffic accident, modern vehicles are often equipped with a protection system comprising several airbags which serve to absorb the energy of a passenger released on the impact of the accident. A deceleration detector detects the impact and operates one or more inflation devices in order to fill the airbag with a gas and deploy it between the occupant of the car and the parts of the bodywork surrounding the dashboard which might injure the occupant.

In order to prevent injuries caused by the airbag itself, it is advantageous to stop the deployment of the airbag once the airbag is close enough to the passenger or when the passenger has sunk sufficiently into the airbag for the airbag to be able to perform its absorbing action. By stopping the deployment of the airbag in this way, it is possible to prevent the pressure exerted by the deployed airbag on the passenger from increasing in an uncontrollable manner.

For protection systems in which the airbag is inflated by several inflators operated successively, a known device exists to stop the deployment of the airbag comprising several metal conductors of different lengths, integrated within the front wall of the airbag, i.e. in the wall of the airbag facing the passenger. Each metal conductor is linked to the inflator operating device so that the breakage of a conductor triggers the operation of an inflator associated to that conductor. As the airbag deploys itself, the front wall of the airbag unfolds and the conductors successively break, thus triggering the operation of the next inflator. When the volume of the airbag is such that the airbag touches the passenger, the front wall of the airbag no longer unfolds and the next conductor does not break. It is thus possible to prevent the next inflator from operating and the pressure exerted by the airbag on the passenger from increasing too much.

Another method of stopping the deployment of the airbag is to control its speed of deployment. This can be achieved by a wire having along its entire length a coding of alternate colours, which is fixed on one side to the inside of the airbag on the front face of the latter. The wire passes through an optical detector which, when the airbag is deployed, detects the speed at which the wire passes through with the aid of the coding e.g. black and white. When the front face no longer moves away from the optical detector, i.e. when the volume of the airbag is such that the front wall touches the passenger, the speed of passage of the wire through the detector becomes zero. The airbag operating device then stops the inflator and/or opens a vent in the airbag so that the latter inflates no further.

The two systems described above, detecting by different methods the collision of the airbag with the occupant of the vehicle, only work if the passenger sufficiently checks the deployment of the airbag for the systems to be triggered. Now a child or a light adult is often of insufficient weight to stop the deployment of the airbag. Consequently, the protection systems do not operate and the deployment of the airbag continues even though a strong pressure is exerted between the airbag and the occupant of the vehicle.

In order to remedy this situation, Document GB-A-2319997 describes a system for stopping the deployment of an airbag in a vehicle, which comprises a proximity detector located on the front face of the airbag. The proximity detector makes it possible to detect the distance of the airbag in relation to an occupant of the vehicle and generates a distance signal which is sent to an airbag operating device. When a certain distance between the airbag and the occupant is reached, the operating device stops the deployment of the airbag. On the one hand such a system makes it possible to prevent the passenger from being injured by the airbag due to bad positioning, on the other this system risks stopping the deployment of the airbag before the latter can perform its shock absorbing function.

SUMMARY OF THE INVENTION

The aim of the present invention is to propose an improved system for stopping the deployment of an airbag in a vehicle.

DETAILED DESCRIPTION OF THE PREFERRED EMBODIMENT

Figure 1:
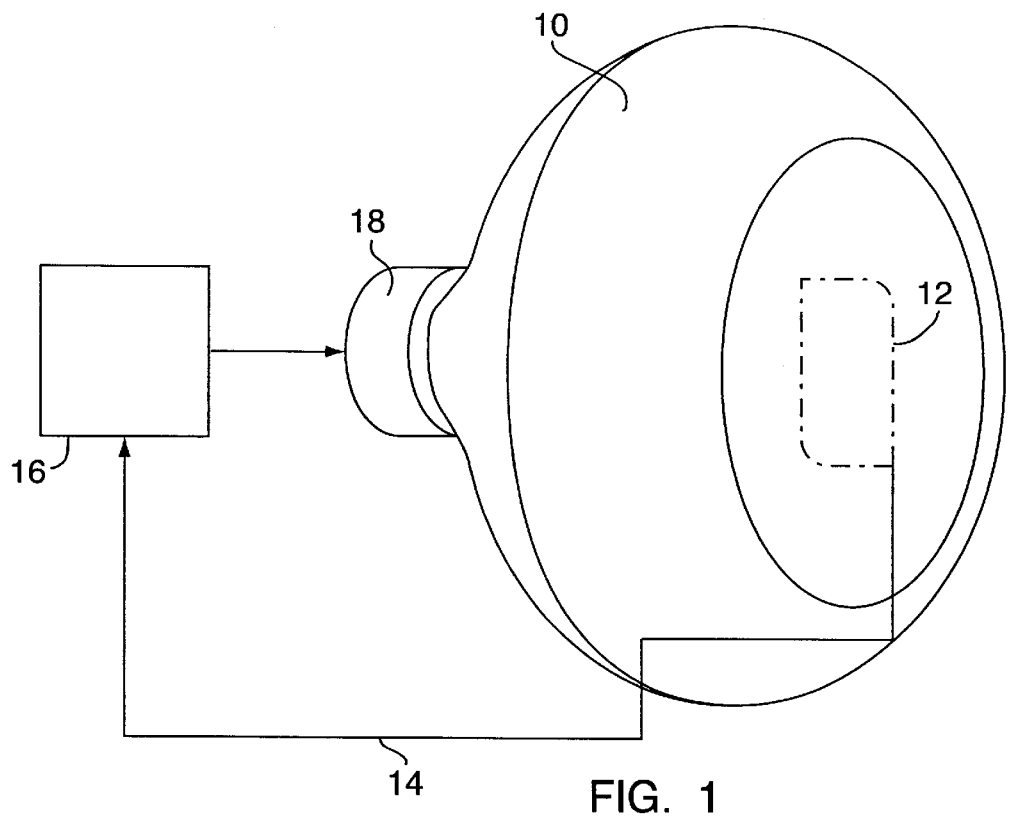
FIG. 1 is a schematic representation of a system for stopping the deployment of an airbag in a vehicle.

According to the invention and as depicted in FIG. 1, this aim is achieved by a system for stopping the deployment of an airbag 10 in a vehicle, comprising a detector 12 for detecting the position of the airbag in relation to an occupant of the vehicle. The detector is located on the airbag in an area which, on deployment of the airbag by an airbag inflator 18, is facing the occupant of the vehicle and generates a position signal which is sent to an airbag operating device 16 via conductors 14 for connecting the detector to the airbag operating device. The operating device stops the deployment of the airbag when the said position signal indicates a preset position of the airbag in relation to the occupant. According to the invention, the detector is a contact detector to detect a contact between the airbag and the occupant. Such a detector makes it possible to detect the collision between the airbag and the passenger.

This system makes it possible to deploy the airbag as soon as certain position of the airbag in relation to the occupant is reached. The occupant need not therefore completely check the deployment of the airbag in order to trigger the stop system. By positioning the sensor e.g. on the front wall of the airbag it is possible to determine the position of the airbag very accurately and therefore to stop the airbag before critical situations could arise.

It should be noted that it is not necessary to detect an absolute position of the airbag or passenger in relation to a fixed point in the car, but it is sufficient to detect the relative position of the airbag in relation to the passenger. This position therefore equally includes the position in which contact is established between the airbag and the passenger, i.e. the collision position.

In a first embodiment, the position detector is a proximity detector. This proximity detector makes it possible to stop deployment of the airbag before contact between the airbag and passenger is established. It is thus possible to take into account the lag between detecting the position and actually stopping the, deployment of the airbag either by opening a vent or by the next inflator not being triggered.

Figure 2:
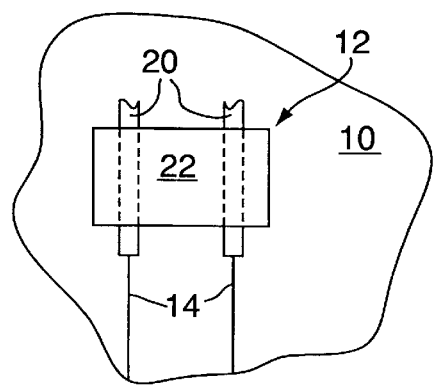
FIG. 2 shows a top view of a contact detector for use in the system of FIG. 1.

In a second embodiment, the said proximity detector is a capacitive sensor comprising at least one electrode structure 20 located on the airbag as depicted in FIG. 2. This capacitive sensor detects variations in capacitance between the electrode and the passenger, connected to it in a capacitive manner to earth. The capacitive sensor consequently detects variations in the capacitance of the electrode and the earth via the passenger. This capacitance sharply decreases when the airbag gets close to the passenger and consequently constitutes an indicator of the distance between the sensor and the passenger.

A capacitive sensor may also comprise at least two electrode structures located on the airbag at a certain distance from each other and isolated from each other. This sensor detects variations in the capacitance between the said electrodes caused by the body of the occupant. The capacitance between the electrodes sharply decreases when the airbag gets close to the passenger and consequently constitutes an indicator of the distance between the sensor and the passenger.

It should be noted that a sensor may advantageously complete a capacitive system for detecting the position of the passenger as described for example in Documents LU 90 180 or LU 90 237 or in EP A 0 838 697. In effect, these systems comprising for example two capacitive electrodes, one of which is integrated into the seat and the other into the dashboard, have the disadvantage of a reduced range of capacitive field. It follows that, particularly in spacious vehicles, these systems cannot cover the entire space between the seat and the dashboard. A capacitive sensor on the airbag can therefore advantageously cover this blind spot in conventional systems.

In a second embodiment, the said proximity detector is an inductive sensor comprising at least one coil structure arranged on the airbag and powered by an alternating current, the said inductive sensor detecting a reduction in the inductive field caused by the proximity of a conductor body.

Regardless of the embodiment of the proximity detector, the system preferably comprises an element associated with the said proximity detector, the said associated element being located on a seat-belt in the said vehicle, and the said associated element modifying or reinforcing a response from the said proximity detector. This associated element may for example comprise a metallic element which reinforces the variation in capacitance in a capacitive sensor. In the case of an inductive sensor, the said associated element may comprise an active inductive structure or a resonator which affects the inductive field of the inductive sensor. The active inductive structure may comprise an inductive coil located in the seat-belt, which is supplied by an alternating current. It is then possible to measure the coupling of the inductive field generated by the coil in the seat-belt with the field of the coil in the airbag. These elements are by way of example described in Document WO 97/06990. It is also possible to envisage a modulation of the inductive field by a binary sequence which makes it possible to filter parasitic noise.

In another embodiment, the position detector is a contact detector. This detector makes it possible to detect the collision between the airbag and the passenger.

The collision may be detected by monitoring the pressure in the airbag. At the moment of the collision the pressure curve has a discontinuity which is easy to detect. Another method consists in monitoring the movement of the front wall of the airbag. This monitoring may be performed inside the airbag, e.g. by an optical system, which detects the moment when the front wall stops moving away from the cassette.

A sensor which is integrated in the airbag may comprise one or more optical fibres, whose properties of light transmission vary with the deformation of the fibre. By monitoring these transmission characteristics, it is possible to detect the moment of collision of the airbag with the passenger by the transmission properties corresponding to a contact or a characteristic deformation of the fibre.

In a preferred embodiment, the said contact detector is a force sensor which detects the pressure exerted by the airbag on the occupant. This system consequently makes it possible to trigger the stop system as soon as a certain pressure limit is reached. The threshold for the pressure may be freely preset, it will be set so as to ensure a sufficient deployment of the airbag for the latter to be able to perform its shock-absorbing function.

Figure 3:
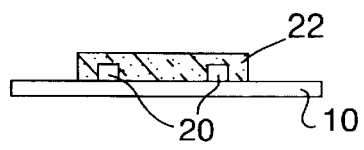
FIG. 3 shows a section taken through the detector of FIG. 2.
Figure 4:
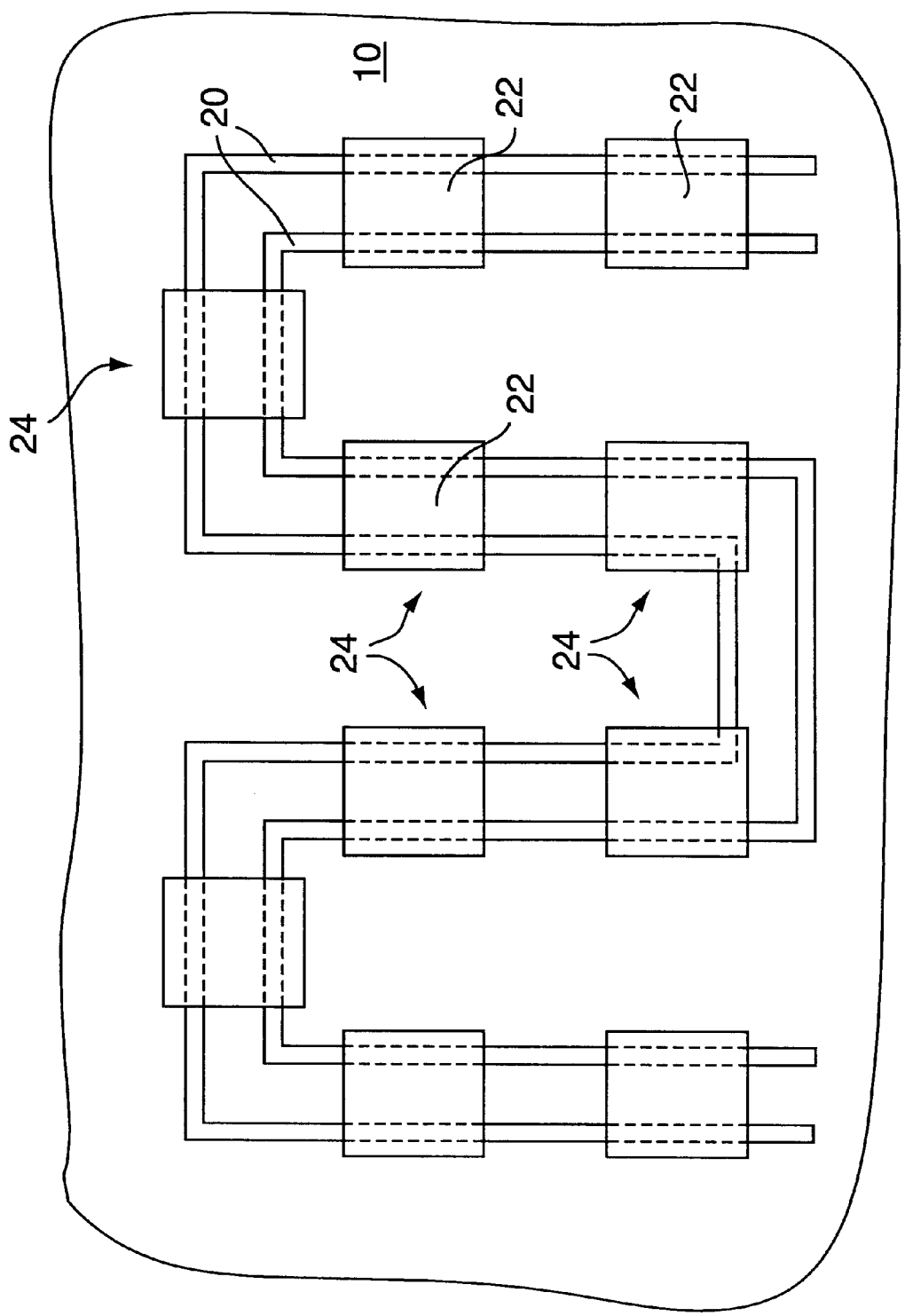
FIG. 4 shows a detector having a plurality of active areas.

Preferably, as depicted in FIGS. 2–4, the force detector comprises at least two electrode structures 20 located on the airbag at a certain distance from each other and a layer of semi-conducting material 22 located in an active area 24 of the sensor, above the said electrode structures and in-close contact with the latter, the said layer of semi-conducting material having an internal resistance varying with the deformation of the said layer. This construction of detector produces a very thin and very flexible force detector which does not hinder the free deployment of the airbag. Indeed, since the electrode structures and the layer of semi-conducting material are directly located on the airbag, this force detector requires no additional support and is consequently very thin.

It should be noted that the internal resistance of the semi-conducting layer may vary in the same direction as the deformation (e.g. the resistance increases when the pressure increases) or in the opposite direction of the deformation (e.g. the resistance decreases when the pressure increases).

In a first embodiment, the said layer of semi-conducting material comprises a semi-conducting ink which is printed onto the said electrode structures. Printing may be achieved, for instance, by silk-screen printing or according to the ink jet principle.

In an alternative embodiment, the said layer of semi-conducting material comprises a conductive elastomer, granulated or non-granulated, which is deposited or glued onto the said electrode structures. This layer of semi-conducting material has better flexibility than layers of semi-conducting ink.

It should be noted that the layer of semi-conducting material is preferably divided into several areas, located at different places above the said electrode structures and thus defining several active areas of the said detector.

The said electrode structures of the capacitive sensor or force sensor are for example deposited or printed directly onto the fabric of the airbag. Alternatively, the said electrode structures are engraved or etched onto a metal layer deposited on the airbag. In another variation, the said electrode structures are woven or knitted directly into the fabric and manufacturing procedures are for example described in Documents LU 90 278, LU 90 256 or LU 90 321.

In order to protect the detector from corrosion, the detector preferably comprises a protective layer applied to the said electrode structures and said layer or layers of semi-conducting material. This may be for example a layer or inert-material paint which is applied by simply immersing the sensor in the paint.

In an advantageous embodiment of the system, the said position detector is linked to the said operating system by the intermediary of conductors deposited or printed on the airbag. These conductors, just like the electrode structures, are very flexible and consequently would not tear when the airbag is folded or deployment.

The system described above preferably has a circuit which monitors the operation of the sensor and integrity of the conductors. Should the system fail, the airbag will be deployed according to a standard method, which it will be prompted to perform by the car's other detection systems.

It should be noted that the system according to the present invention may be used for all types of airbag on a vehicle, namely for front airbags, side airbags, head airbags, etc. A system for protecting the occupants of a vehicle comprising several airbags may therefore comprise several systems for stopping the deployment of an airbag, each system for stopping the deployment of an airbag being associated to one of the airbags on the vehicle.

It should be noted that this system for stopping the deployment of an airbag in a vehicle makes it possible to improve considerably the algorithm of deployment of the airbag. In a car equipped with this system, the initial decision to deploy the airbag or airbags according to a certain method may be taken very soon after detecting an impact. The system as described in fact makes it possible to review the decision to deploy at any moment in the deployment phase, in cases where the position of the passenger in relation to the airbag would have an unfavourable outcome.

What is claimed is:

1. A system for stopping the deployment of an airbag in a vehicle, comprising a detector for detecting a position of said airbag with respect to an occupant of the vehicle and an airbag operating device, said detector being located on said airbag in an area which, on deployment of the airbag, is facing said occupant of the vehicle, said detector generating a position signal which is sent to said airbag operating device, and said airbag operating device stopping the deployment of the airbag when said position signal indicates a preset position of the airbag in relation to the occupant, wherein said detector is a contact detector for detecting a contact between the airbag and the occupant;

wherein said contact detector is a force sensor, said force sensor detecting the pressure exerted by said airbag on said occupant; and wherein the force sensor comprises at least two electrode structures located on said airbag at a certain distance from each other and a layer of semi-conducting material located in an active area of said force sensor, above said electrode structures, said layer of semi-conducting material being in close contact with said electrode structures, and said layer of semi-conducting material having an internal resistance varying with the deformation of said layer.

2. The system according to claim 1, wherein said layer of semi-conducting material comprises a semi-conducting ink which is printed onto said electrode structures.

3. The system according to claim 1, wherein said layer of semi-conducting material comprises a conductive elastomer which is deposited onto said electrode structures.

4. The system according to claim 1, wherein said layer of semi-conducting material comprises a conductive elastomer which is glued onto said electrode structures.

5. The system according to claim 1, wherein the layer of semi-conducting material is divided into several areas, located at different places above said electrode structures and defining several active areas of said force sensor.

6. The system according to claim 1, wherein said electrode structures are printed on the airbag.

7. The system according to claim 1, wherein said electrode structures are deposited on the airbag.

8. The system according to claim 1, wherein said electrode structures are engraved or etched into a metal layer deposited on the airbag.

9. The system according to claim 1, wherein said electrode structures are woven or knitted into the airbag.

10. The system according to claim 1, comprising a protective layer applied to said electrode structures and said layer of semi-conducting material.

11. The system according to claim 1, wherein said contact detector is connected to said airbag operating system by means of conductors deposited or printed on the airbag.

12. The system according to claim 1, comprising at least one airbag and at least one system for stopping the deployment of the airbag.

13. The system according to claim 12 further comprising several airbags and several systems for stopping deployment of said airbags, wherein each of said systems is associated with stopping a deployment of one of said airbags of the vehicle.

* * * * *